United States Patent [19]

Volk

[11] Patent Number: 5,498,201
[45] Date of Patent: Mar. 12, 1996

[54] RETAINER FOR POULTRY HOCKS

[75] Inventor: Daniel J. Volk, Alpharetta, Ga.

[73] Assignee: Volk Enterprises, Inc., Turlock, Calif.

[21] Appl. No.: 254,247

[22] Filed: Jun. 6, 1994

[51] Int. Cl.⁶ ................................................. A22C 21/00
[52] U.S. Cl. ............................................. 452/174; 383/71
[58] Field of Search ................................. 452/174, 176; 383/71

[56] References Cited

U.S. PATENT DOCUMENTS

| | | | |
|---|---|---|---|
| 1,123,019 | 12/1914 | Selden | 452/176 |
| 3,348,595 | 10/1967 | Stevens, Jr. | 383/71 |
| 3,357,070 | 12/1967 | Sloan | 383/71 |
| 4,818,121 | 4/1989 | Volk | 383/71 |
| 5,102,370 | 4/1992 | Volk | 452/174 |
| 5,112,274 | 5/1992 | Volk | 452/174 |
| 5,279,519 | 1/1994 | Volk | 452/174 |
| 6,181,880 | 1/1993 | Volk | 452/174 |

FOREIGN PATENT DOCUMENTS

| | | | |
|---|---|---|---|
| 205672 | 12/1986 | European Pat. Off. | 383/71 |
| 1353431 | 1/1964 | France | 383/71 |
| 1218932 | 6/1966 | Germany | 383/71 |

*Primary Examiner*—Willis Little
*Attorney, Agent, or Firm*—Flehr, Hohbach, Test, Albritton & Herbert

[57] ABSTRACT

A retainer for use with a body of eviscerated poultry having legs with hocks. The retainer comprises a unitary substantially coplanar thin plastic member adapted for mounting about the hocks. The plastic member has an outer portion defining an opening of sufficient size to permit the hocks to pass therethrough. A plurality of prong portions extend inwardly from the outer portion for engaging the legs so as to hold the hocks together in juxtaposition.

18 Claims, 1 Drawing Sheet

U.S. Patent     Mar. 12, 1996     5,498,201
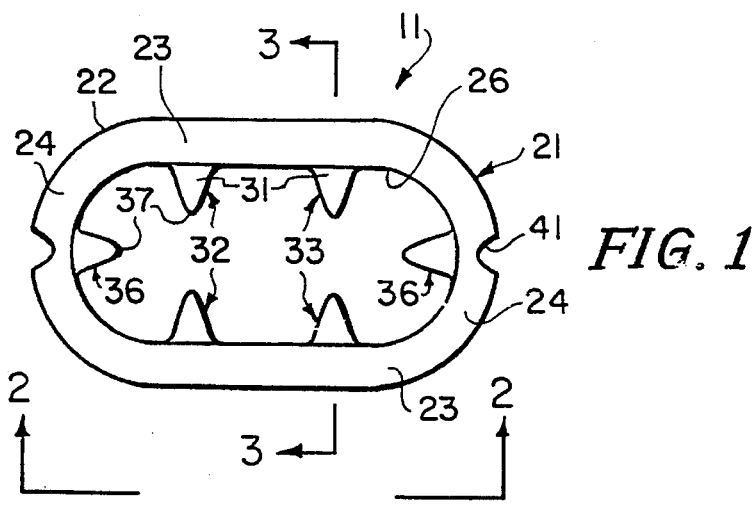
FIG. 1
FIG. 2
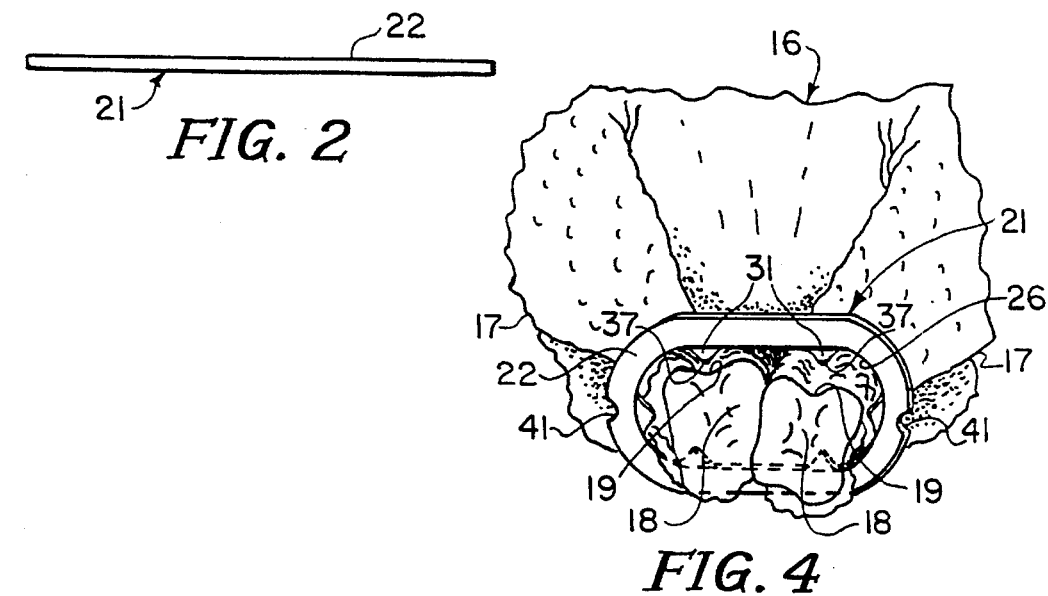
FIG. 4
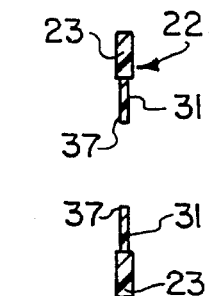
FIG. 3
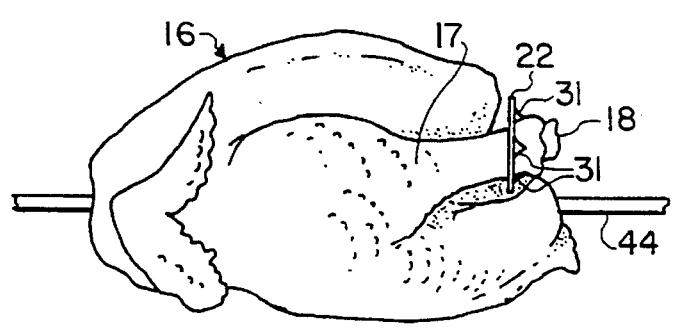
FIG. 5

5,498,201

RETAINER FOR POULTRY HOCKS

BACKGROUND OF THE INVENTION

1. Field of the Invention

This invention relates in general to a retainer or truss for poultry or fowl and pertains, more specifically, to a retainer for securing hocks of small fowl during processing, shipping and cooking.

2. Prior Art.

Whole bodies of eviscerated poultry such as chicken are currently packed and shipped for retail to the consumer. In some instances, the eviscerated chicken are flavorized prior to shipping and cooked by the retailer prior to sale. Cooking of the chickens is often accomplished by skewing the chickens and mounting them on a rotisserie for baking in an oven. Since chicken legs tend to loosen during cooking, it is usually the practice to secure the legs to the body during cooking. In one common method of securement, the skin is slit and the leg tucked beneath the skin. This method of securing chicken legs during cooking suffers from a number of disadvantages, including possible contamination of the chicken and difficulties in cooking if the leg comes out of the slit due to improper formation of the slit.

Accordingly, a primary object of the present invention is to provide a retainer for use with a body of eviscerated poultry to secure the hocks in juxtaposition during shipping and cooking.

Another object of the invention is to provide a retainer of the above character which is suitable for use with small poultry such as chicken.

Another object of the invention is to provide a retainer of the above character which can be easily attached to the chicken body.

Another object of the invention is to provide a retainer of the above character which is suitable for an automated installation process.

Another object of the invention is to provide a retainer of the above character which can be utilized to indicate characteristics of the chicken such as flavor.

SUMMARY OF THE INVENTION

In general, the invention consists of a retainer for use with a body of eviscerated poultry having legs with hocks. The retainer comprises a unitary substantially coplanar thin plastic member adapted for mounting about the hocks. The plastic member has an outer portion defining an opening of sufficient size to permit the hocks to pass therethrough. A plurality of prong portions extend inwardly from the outer portion for engaging the legs so as to hold the hocks together in juxtaposition.

BRIEF DESCRIPTION OF THE DRAWINGS

The accompanying drawings, which are incorporated in and form a part of this specification, illustrate an embodiment of the invention and, together with the description, serve to explain the principles of the invention.

FIG. 1 is top plan view of the retainer of the present invention.

FIG. 2 is a side elevational view of the retainer of FIG. 1 taken along the line 2—2 of FIG. 1.

FIG. 3 is a cross-sectional view of the retainer of FIG. 1 taken along the line 3—3 of FIG. 2.

FIG. 4 is an enlarged view of a chicken with the retainer of FIG. 1 in position thereon.

FIG. 5 is a side elevational view of the chicken of FIG. 4 skewered for mounting in a rotisserie.

DETAILED DESCRIPTION OF THE PREFERRED EMBODIMENTS

Reference will now be made in detail to the preferred embodiment of the invention, an example of which is illustrated in the accompanying drawings. While the invention will be described in conjunction with the preferred embodiment, it will be understood that the invention is not limited to this embodiment. On the contrary, the invention is intended to cover alternatives, modifications and equivalents, which may be included within the spirit and scope of the invention as defined by the appended claims.

Turning now to the drawings, wherein like components are designated by like reference numerals throughout the various figures, attention is directed to FIGS. 1 through 5 where one embodiment of the invention is illustrated.

Poultry leg truss or retainer 11 of the present invention is for use with a carcass or body 16 of eviscerated poultry such as a chicken or other fowl having drumsticks or legs 17 with exposed knuckles or hocks 18 (see FIGS. 4 and 5). Each of the hocks is formed with a groove 19 which extends from one side of the hock around the end to the other side of the hock. Retainer 11 is made from a unitary thin substantially coplanar member 21 made from any suitable material such as plastic and preferably injection molded out of nylon. Longitudinally extending thin member 21 includes an outer or ring-like peripheral portion in the form of oblong-shaped ring 22 having a band width of approximately 0.23 inch and a band thickness of approximately 0.05 inch. Ring 22 is relatively rigid and is formed from parallel first and second elongate portions 23 joined at respective ends by semicircular-shaped first and second end portions 24. Oblong ring 22 defines a central opening 26 which is of a sufficient size to permit hocks 18 of chicken body 16 to pass therethrough. More specifically, elongate portions 23 are spaced apart a distance of approximately one inch and end portions 24 have an inner radius of approximately 0.5 inch so that central opening 26 has a length of approximately 2.2 inches at its widest point across the longitudinal center of thin member 21. Although oblong ring 22 is shown as being closed, it should be appreciated that the ring could be open and/or made from metal or wire and be within the scope of the present invention.

A plurality of prong portions or prongs 31 extend inwardly from oblong ring 22. Prongs 31 are spaced around the inside of the oblong ring so as to be aligned in opposed pairs, although a retainer 11 having prongs not aligned in opposed pairs would be within the scope of the present invention. First and second opposed pairs 32 and 33 are in general parallel alignment and extend inwardly from elongate portions 23 adjacent the ends of the elongate portions. Opposed pairs 32 and 33 have a center-to-center spacing of approximately 0.8 inch. Third opposed pair 36 is disposed at a right angle to first and second opposed pairs 32 and 33 and extends inwardly from the center of end portions 24 along the longitudinal centerline of thin member 22. Each of prongs 31 tapers toward an end portion 37 as it extends inwardly from oblong ring 22 and, as such, is generally triangular in shape. The prongs each extend inwardly from the oblong ring a distance of approximately 0.25 inch and have a thickness of approximately 0.03 inch so as to be relatively flexible in comparison to oblong ring 22.

Retainer 11 further includes a semicircular groove 41 formed on the outside of each end portion 24 of oblong ring 22. Grooves 41 are generally centered on the longitudinal centerline of thin member 22.

In operation and use, retainer 21 is adapted for mounting about hocks 18 of chicken body 16 for retaining the hocks together in juxtaposition during shipping, storage and cooking. As discussed above, central opening 26 of oblong ring 22 is sized so that hocks 18 can fit therethrough. The hocks can be placed sequentially through the central opening or, in the alternative, the hocks can be pushed through the central opening together after being placed in a side by side position. Prongs 31 are longitudinally sized so that they engage hocks 18 during placement of retainer 21 on body 16 and are sufficiently flexible so as to bend away from the advancing hocks and permit the hocks to pass through central opening 26. The reduced thickness of the prongs in comparison to the oblong ring, as shown in FIG. 3, permits this flexibility.

The relative alignment of prongs 31 facilitates placement of retainer 11 on chicken body 16 and the securement of the retainer to chicken legs 17. The longitudinal spacing between first and second opposed pairs 32 and 33 is such that prong end portions 37 are in general alignment with grooves 19 of the hocks as retainer 11 is pushed thereover. Once the flexible prongs have advanced over the hocks, they bend back toward their planar or home position until end portions 24 engage legs 17 adjacent or behind hocks 18. When in this retaining position, prongs 31 are bent outwardly toward the hocks so that end portions 37 engage the rear of the hocks and serve to retain thin member 22 in its mounted position about legs 17 (see FIG. 5). The prongs of first and second opposed pairs 32 and 33 are substantially centered on legs 17 of chicken body 16 and exert generally counter-balancing forces against opposite sides of the legs (see FIG. 4). The prongs of third opposed pair 36 are substantially centered on opposite sides of legs 17 and serve to urge the legs toward each other so that hocks 18 are in juxtaposition.

Chicken body 16 with hocks 18 trussed by retainer 11 can be packaged and shipped to a retailer. As will be appreciated by those skilled in the art, packaging is made easier because of the relative uniformity amongst the trussed chicken bodies. The retailer can sell the chickens uncooked or mount them to a rotisserie bar 44, as illustrated in FIG. 5, for cooking prior to sale. Retainer 11 holds legs 17 in place against chicken body 16 during cooking. In addition, the cooking of the chicken body is enhanced by the trussing of the legs.

Retainer 11 is particularly suited for storage and shipping and grooves 41 can be utilized to facilitate stacking and storage of the retainers in general alignment with each other. Retainer 11 can also be installed on the chicken in an automated process and grooves 41 may be utilized for gripping and aligning the retainer in this regard. In addition, retainer 21 can serve as a label stating certain information regarding the chicken to which it is attached. For example, the retainer can be imprinted and/or colored to indicate characteristics such as flavoring of the chicken.

Although certain measurements have been included for retainer 11, it should be appreciated that the retainer can be made to fit chickens of varying sizes. In addition, the retainer can also be sized to fit other poultry such as turkey and be within the scope of the present invention.

It is apparent from the foregoing that a retainer for use with a body of a eviscerated poultry has been provided to secure the hocks of the poultry in juxtaposition during shipping and cooking. The retainer is suitable for use with small poultry such as chicken and can be easily attached to the chicken body. The retainer is suitable for an automated installation process and can also be used to indicate characteristics of the chicken such as flavor.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, and to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A retainer for use with a body of eviscerated fowl having legs with hocks, comprising a unitary substantially planar thin plastic member which mounts about the hocks, the plastic member having an outer portion defining an opening which is generally oblong in shape and of sufficient size to permit the hocks to pass therethrough, a plurality of prong portions extending inwardly into the oblong opening from the outer portion for engaging the legs so as to hold the hocks in juxtaposition.

2. A retainer as in claim 1 wherein the prong portions have end portions and are longitudinally sized so that the end portions engage the legs adjacent the hocks when the plastic member is mounted about the hocks.

3. A retainer as in claim 2 wherein the prong portions are longitudinally sized and have a sufficient flexibility relative to the outer portion so as to bend outwardly toward the hocks when the plastic member is mounted about the hocks.

4. A retainer as in claim 2 wherein the outer portion has a thickness and the prong portions have thicknesses less than the thickness of the outer portion.

5. A retainer as in claim 1 wherein the prong portions taper toward the end portions so as to be triangular in shape.

6. A retainer as in claim 1 wherein the prong portions are spaced around the outer portion so as to be aligned in opposed pairs.

7. A retainer as in claim 6 wherein two of the opposed pairs of prong portions are in parallel alignment and spaced apart a distance which permits said two opposed pairs of prong portions to be substantially centered on the legs when the plastic member is mounted about the hocks.

8. A retainer as in claim 7 wherein another opposed pair of prong portions is in perpendicular alignment with said two opposed pairs of prong portions and is substantially centered on the legs when the plastic member is mounted about the hocks.

9. A retainer as in claim 1 wherein the outer portion is closed.

10. A retainer for use with a body of eviscerated fowl having legs with hocks, comprising a unitary substantially planar thin member which mounts about the hocks, the thin member having a ring-like portion defining an opening which is generally oblong in shape and sufficient size to permit the hocks to pass therethrough, a plurality of prong portions extending inwardly from the ring-like portion into the oblong opening for engaging the legs adjacent the hocks, the prong portions being spaced around the ring-like portions so as to hold the hocks in juxtaposition and being longitudinally sized and being of sufficient flexibility relative to the outer portion so as to bend outwardly toward the hocks when the thin member is mounted about the hocks.

11. A retainer as in claim 10 wherein the thin member is made from plastic.

12. A retainer as in claim 11 wherein the thin member is oblong in shape and wherein the prong portions are spaced around the ring-like portion so as to be aligned in opposed pairs.

13. A retainer for use with a body of eviscerated fowl having legs with hocks, comprising a unitary substantially planar thin plastic member which mounts about the hocks, the plastic member having spaced apart elongate portions joined by spaced apart arcuate portions, the elongate and arcuate portions defining an opening which is generally oblong in shape and of sufficient size to permit the hocks to pass therethrough, a plurality of first prong portions extending inwardly into the oblong opening from the elongate portions and a plurality of second prong portions extending inwardly into the oblong opening from the arcuate portions, the prong portions serving to engage the legs so as to hold the hocks in juxtaposition.

14. A retainer as in claim 13 wherein the first prong portions are aligned in opposed pairs.

15. A retainer as in claim 13 wherein the second prong portions are centrally aligned on the arcuate portions so as to be opposed to each other.

16. A poultry product ready for baking comprising an eviscerated fowl having first and second legs with hocks, a unitary substantially planar thin plastic member for mounting about the hocks, the plastic member having an outer portion defining an opening of sufficient size to permit the hocks to pass therethrough, a plurality of prong portions extending inwardly into the opening from the outer portion for engaging the legs so as to hold the hocks together.

17. A poultry product as in claim 16 wherein the plastic member contains certain information regarding the fowl.

18. A poultry product as in claim 17 wherein the plastic member has a color to indicate the flavoring of the fowl.

* * * * *